April 1, 1941.　　　R. W. HAUTZENROEDER　　　2,236,598
MOWING MACHINE
Filed April 3, 1939　　　6 Sheets-Sheet 1

INVENTOR.
RICHARD W. HAUTZENROEDER
BY
Oberlin, Limbach & Day
ATTORNEYS.

April 1, 1941.  R. W. HAUTZENROEDER  2,236,598
MOWING MACHINE
Filed April 3, 1939  6 Sheets-Sheet 4

INVENTOR.
RICHARD W. HAUTZENROEDER
BY
Oberlin, Limbach & Day
ATTORNEYS.

April 1, 1941. R. W. HAUTZENROEDER 2,236,598
MOWING MACHINE
Filed April 3, 1939 6 Sheets-Sheet 5

FIG. 6
FIG. 7

INVENTOR.
RICHARD W. HAUTZENROEDER
BY
Oberlin, Limbach + Day
ATTORNEYS

Patented Apr. 1, 1941

2,236,598

UNITED STATES PATENT OFFICE 2,236,598

MOWING MACHINE

Richard W. Hautzenroeder, Mansfield, Ohio, assignor to The Fate-Root-Heath Company, Plymouth, Ohio, a corporation of Ohio Application April 3, 1939, Serial No. 265,725

6 Claims. (Cl. 56—273)

This invention relates, as indicated, to improvements in mowing machines and more particularly to mowing machines employing a reciprocating cutter bar which carries the cutting knives and which mowing machine is associated with a motor-driven vehicle or at least a vehicle provided with power means which is utilized not only for the actuation of the cutter bar but the positioning and control devices therefor.

My invention is particularly applicable to mowing machines which require manipulation of the cutter bar during the mowing operation through a relatively wide angle of displacement, both from the standpoint of angular displacement with respect to the plane on which the mowing machine rests, as well as lateral, i. e., vertical displacement with respect to such plane.

Conditions requiring such wide manipulation of the cutter bar with respect to the supporting and driving vehicle therefor are most often encountered in machines utilized for the purpose of mowing public ways, such as roads, streets, embankments, levees, etc. It frequently occurs that the mowing machine will operate along the top of an embankment so that the slope being mowed is lower than and slopes away from the path followed by the mowing machine and again, the reverse may be true, i. e., the bank being mowed may extend upwardly and even at a very sharp angle from the surface along which the mowing machine passes.

In other situations, the mowing machine frequently moves along a low embankment which is relatively flat on the upper surface which is to be mowed, so that the cutter bar, while extending in a substantially horizontal plane, is required to operate in a plane which lies above (or below) the plane occupied by the mowing machine.

Any highway mowing machine, for example, which is capable of performing all of these functions must obviously be capable of very wide adjustments of the cutter bar with respect to the machine proper and if the machine is to be usable with the necessary facility, it is necessary that these adjustments must be capable of being made by the operator with a minimum of effort and while the machine is in motion.

A machine of the character described should also be provided with safety means for the purpose of preventing damage to the equipment if, for example, the cutter bar strikes an immovable object during the forward movement of the machine. Some means must be provided for breaking back the cutter bar when a predetermined force strikes its leading face so that displacement of the cutter bar relative to the machine is permitted in such a way that the machine may progress in the forward direction without the cutter bar being broken as it strikes the immovable object.

It is a principal object of my invention to provide a mowing machine which has all of the above-described desirable characteristics.

Other objects of my invention will appear as the description proceeds.

To the accomplishment of the foregoing and related ends, said invention, then consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

Figures 1, 2A, 8, 9:
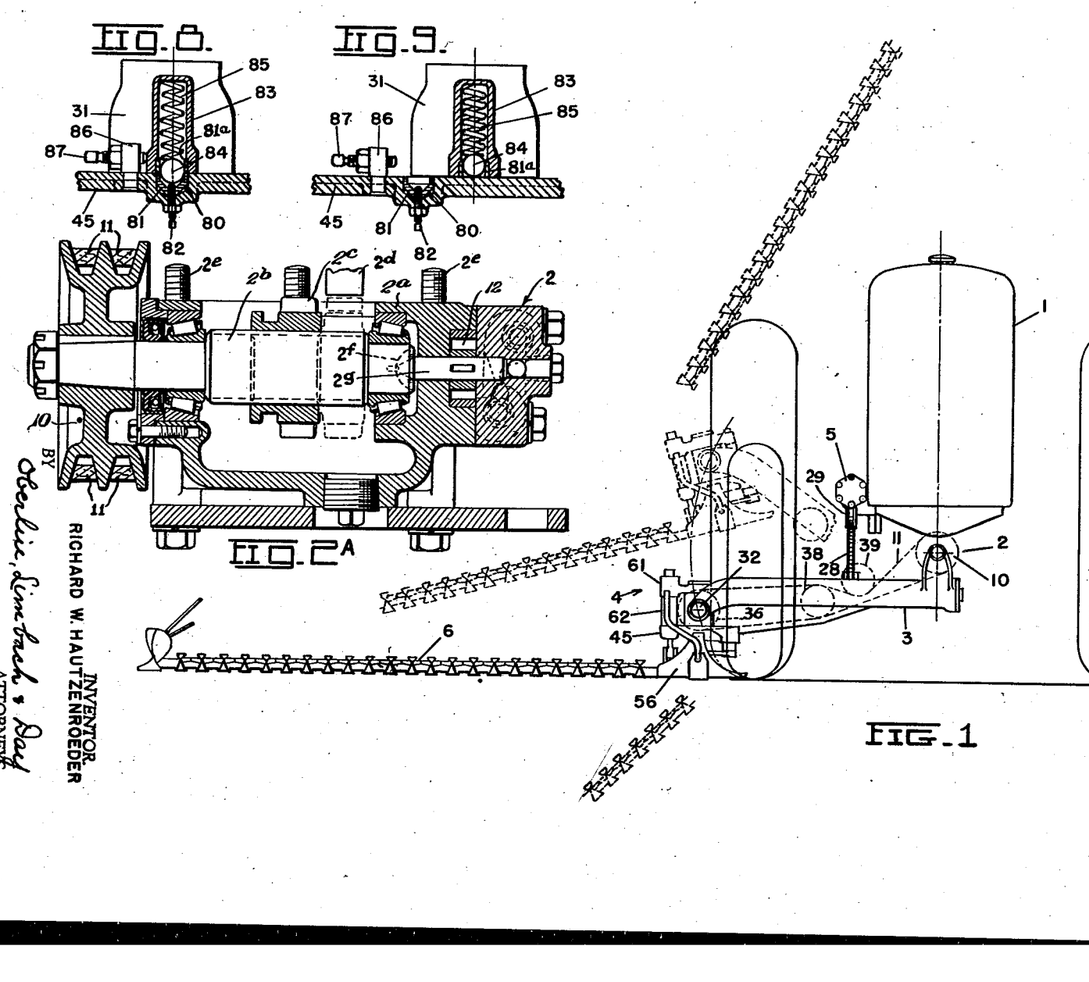
Figure 1 is a front elevational view of a mowing machine constructed in accordance with the principles of my invention, shown associated with a tractor, the latter being illustrated in outline so as not to obscure the detailed showing of the mowing machine itself. This figure also includes several dotted line representations indicating at least three possible alternative positions for the cutter bar element of the mowing machine.
Figure 2a is a transverse sectional view of the power take-off and hydraulic fluid pump assembly.
Figures 8 and 9 (on the same sheet with Fig. 1) are fragmentary sectional views of a portion of the inner cutter bar head shown in Figs. 4 and 5 and particularly illustrating in different positions the break back lock for the cutter bar, which is effective when the cutter bar meets an immovable object to permit the cutter bar to break back about the axis of pivotal support vertical to the plane thereof and located at the inner end of the cutter bar. These figures are side elevational views, partially in section, of a portion of Fig. 5.

Referring now more specifically to the drawings and more especially to Fig. 1, the mowing machine here illustrated as one of the embodiments of my invention is associated with a tractor, generally indicated at 1, such tractor being merely shown in outline in order not to obscure the illustration of the mowing machine itself. The mowing machine apparatus which is thus attached to the tractor may be generally subdivided into the following components, viz:

The power take-off and fluid pump assemblage, generally indicated at 2; the cutter bar supporting arm, generally indicated at 3; the inner cutting arm, generally indicated at 3; the inner cutter bar head, generally indicated at 4; the vertical lift assemblage, generally indicated at 5; and the cutter bar itself, generally indicated at 6.

The several elements of the combination, as above identified, will now be described in the order stated.

The power take-off and fluid pump assembly 2, as illustrated in Figure 2a, includes a suitable housing 2a, adapted to be secured by bolts such as 2e to the bottom of the tractor. A shaft 2b, journalled in said housing 2a, carries a pulley 10 about which are trained belts 11 which drive the blade of the cutter bar. The opposite end of the shaft 2b is terminally slotted as at 2b to receive the complementary end of a shaft 2g which drives a conventional gear pump 12, of the type illustrated for example in U. S. Patents Nos. 1,682,563; 1,682,564; and 1,682,565, which is employed for the purpose of generating pressure in the hydraulic control system hereinafter more particularly described. The pump 12 is connected to such hydraulic system by a conduit 109 through which the fluid is returned to the pump and conduit 117 by which the fluid is delivered from the pump under pressure.

Slidably mounted on the shaft 2b is a pinion 2c, adapted to be moved into and out of engagement with a gear 2d which forms a part of the transmission mechanism of the tractor and by which the power take-off is driven.

Figure 6:
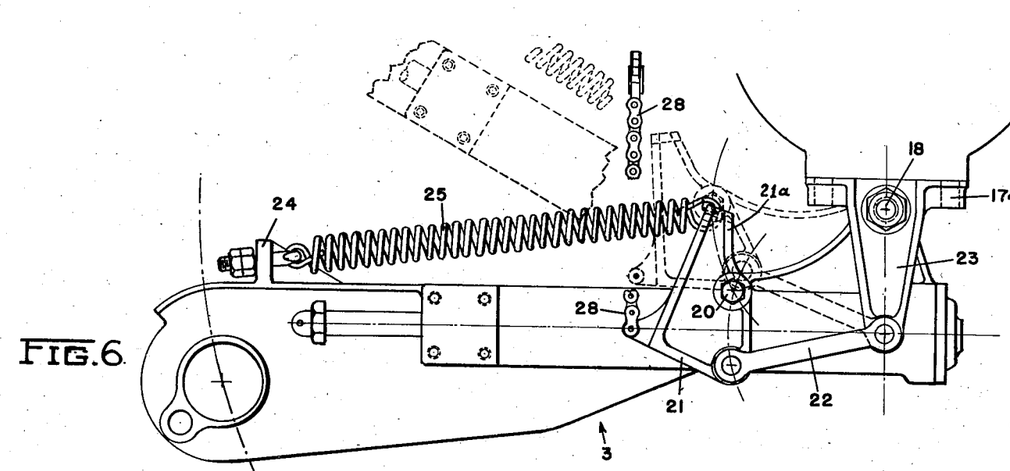
Figure 6 is a side elevational view of the cutter bar supporting arm and its associated actuating counter-balancing linkage, this being the arm by which the cutter bar assembly is pivotally connected to and supported from the vehicle proper.

The cutter bar supporting arm 3 as generally illustrated in Fig. 1 is perhaps most clearly shown as to details of construction in Fig. 6. This arm by which the cutter bar assembly is pivotally connected to the vehicle, such as the tractor, is a casting, generally indicated at 13, which casting includes a cylinder 14, a forwardly and downwardly extending apron 15 and an upwardly extending securing arm 16. The arm 16 is pivotally secured to a bracket 17 which is bolted to the bottom of the tractor, such pivotal connection being made by means of a pin 18 extending through the opening 17 of the arm 16.

Figure 2:
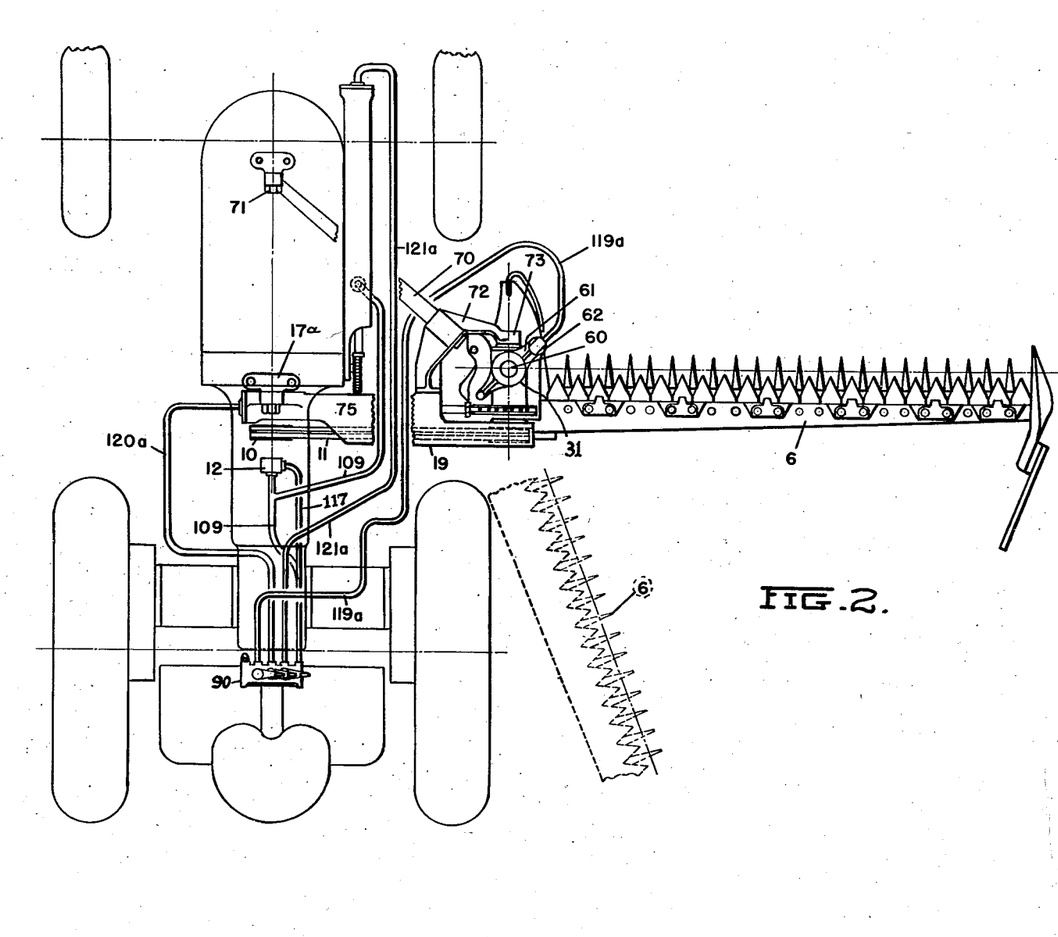
Figure 2 is a plan view of the mowing machine illustrated in Figure 1, the cutter bar in its "broken back" position being indicated by dotted lines.

It will thus be observed that the cylinder 14 is utilized as a structural member along with the integral forwardly and downwardly extending apron 15. The integral apron 15 serves not only as a structural member carrying the load imposed on the arm 3, but also serves as a grass guard for the drive belts 11. As indicated in Fig. 2, there is a horizontal rearwardly extending flange 19 integral with the casting 13 which serves to additionally reinforce the arm 3 and shield the belts 11.

Pivotally mounted on the arm 3 by means of the pin 20 is a bell crank 21. Pivotally secured to the bell crank 21 is a link 22 which, at its opposite end, is pivotally connected to a depending arm 23 of the bracket 17.

An integral extension 24 adjacent the outer end of the arm 3 serves as an anchor for the outer end of a spring 25, which, at its inner end, is connected to the bell crank 21, by having the right hand end of the spring 25 engage the extension 21a of the bell crank 21 as shown in Fig. 6. The spring 25, as installed, is under considerable tension, tending to rotate the bell crank 21 in a counter-clockwise direction. Such rotation is, however, opposed by the compression link 22. It will thus be observed that the tension in the spring 25 tends to rotate the arm 3 in a clockwise direction about the axis of the supporting pin 18. The size of spring selected and the degree to which it is deformed upon being installed is so selected and adjusted that the spring 25 substantially, although not entirely, counterbalances the weight of the arm 3 and the apparatus connected thereto, such as the cutter bar and the inner cutter bar head assembly.

Mounted on the tractor in the position most clearly illustrated in Fig. 1, is a jack, generally indicated at 5. Now, this jack 5, as most clearly illustrated in Fig. 3, comprises a cylinder 26, a piston 27 and a spring 28a. The piston 27 of the jack 5 is connected by means of a chain 28 to the bell crank 21, as illustrated in Fig. 6, such chain passing over a pivotally supported partial sheave 29.

As previously indicated, the spring 25 is under tension to such a degree as to substantially, although not entirely, counter-balance the weight of the arm 3 and the apparatus supported thereby. The spring 28a of the jack 5 being under compression, is of such size and of such characteristics as to exert a force on the piston 27 urging the same to the left and the chain 28 upwardly by such a force, supplementing the force of the spring 25, to more than counter-balance the arm 3. In other words, when no fluid is admitted to the lefthand end of the jack 5, as viewed in Fig. 3, the spring 28a and the spring 25 move the arm 3 and the mechanism supported thereby in a clockwise direction, as viewed in Fig. 6, for as far as arm 3 may be moved in such direction. By admitting fluid under pressure to the lefthand end of the jack 5, this serves to compress the spring 28a, moving the piston 27 to the right for a predetermined amount, depending upon the amount of fluid which has been admitted to the jack; thus, the arm 3 may be permitted to fall, i. e., rotate in a counter-clockwise direction as viewed in Fig. 6, for an amount sufficient to bring the cutter bar supported thereby into the desired position.

It will be observed that the function of the jack 5 and its associated mechanism just described is to raise and lower the inner cutter bar head by means of a pivotal movement of the arm 3; thus, the position of the entire cutter bar assembly with respect to the plane on which the vehicle such as the tractor rests may be adjusted.

In Fig. 1, the full line position of the parts shows the cutter bar arm 3 in a substantially horizontal position so that the inner cutter bar head 4 places the cutter bar in the same plane with the surface on which the wheels of the tractor rest. Immediately above this full line position is a dotted line illustration in part of the extent to which the inner cutter bar head 4 may be raised by a rotation in a clockwise direction of the cutter bar arm 3 by means of the jack 5 and its associated mechanism just described.

It will be observed from the construction of the parts described as such, that the cutter bar arm 3 may be rotated from the full line position illustrated in Fig. 1 to a position remote therefrom in a counter-clockwise direction; thus, permitting the cutter bar assembly to drop to a plane below that on which the tractor wheels rest.

In order to describe the manner in which the inner cutter bar head 4 is supported and controlled in order that the cutter bar itself may be moved angularly with respect to the cutter bar arm 3 into the several positions shown in dotted lines in Fig. 1, it will be necessary to first describe the construction of such inner cutter bar head.

Figure 5:
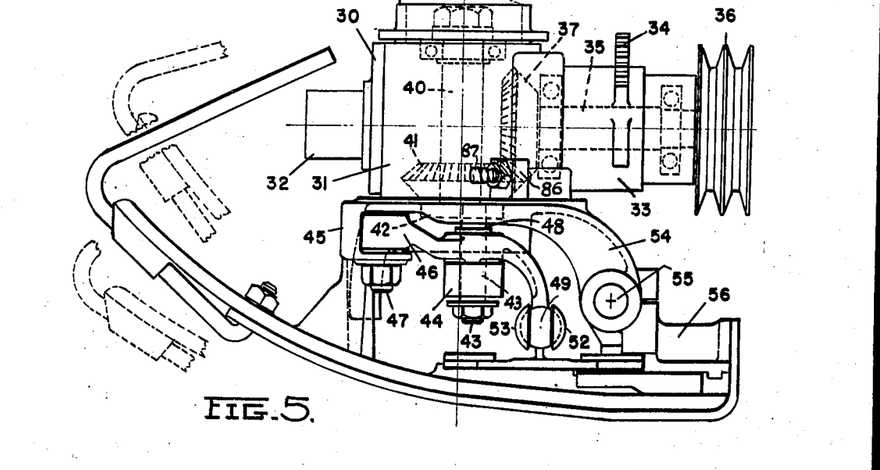
Figure 5 is a side elevational view of the assemblage illustrated in Figure 4, with certain portions of the cutter bar driving apparatus not illustrated in Fig. 4, illustrated in dotted lines.

By first having reference to Fig. 5, it will be observed that the inner cutter bar head includes a gear housing 30 which comprises a central substantially rectangular housing 31 which is provided on its forward side with a trunnion 32 and on its rear face with an extension 33 which carries a segment 34. Journalled in the housing 31 and the lateral extension 33 thereof is a driving shaft 35, on one end of which is secured a pulley or sheave 36 and on the other end of which there is secured a bevel pinion 37. The belt 11, as most clearly illustrated in Fig. 1, is trained about the pulleys or sheaves 10 and 36, suitable idlers such as 38 and 39 being provided for the purpose of maintaining the belt in proper driving engagement with such sheaves.

Rotatably mounted within the housing 31 is a driving shaft 40 to which is secured a bevel gear 41 which meshes with the bevel pinion 37. On the lower end of the shaft 40 is provided a disk-shaped enlargement 42 which carries an eccentric pin 43. Secured to the eccentric pin 43 is a connecting rod 44. A casting 45 is rotatably mounted on the lower end of the housing 31 with the axis of rotation thereof coinciding with the axis of the shaft 40. This rotatable connection between members 31 and 45 is effected by means of a cylindrical extension on the bottom of the former which extends into the complementary opening 45a of the latter. To more particularly illustrate this connection in Fig. 5 would be merely confusing with the number of lines necessary to show other details of construction.

The casting 45 is normally restrained against rotation relatively to the housing 31 by the break-back lock which will presently be described.

The casting 41 has pivotally supported thereon a multiplying lever 46 by means of the pin 47. The inner end of the connecting rod 44 is connected by means of the pin 48 to the multiplying lever 46. The end of the multiplying lever 46 opposite its point of connection to the pin 47 is provided with a ball head 49. A ball head 50 is provided on the inner end of the cutter bar blade 51. This construction is conventional in all mowing machines of this character.

Driving communication between the cutter bar blade 51 or more particularly the ball head 50 thereon and the multiplying lever 46, or more particularly the ball head 49 thereon, is established by means of a pair of complementary links 52 and 53, the opposite ends of which are formed with complementary recesses which, when the two link sections are brought together, as by a bolt 52a, respectively embrace the ball heads 49 and 50.

The casting 45 has a rearwardly and downwardly extending projection 54 which carries a pivot pin 55. Pivotally secured to the pivot pin 55 is a casting 56 to which the inner end of the cutter bar 57 is bolted. The cutter bar is of conventional construction and carries the usual sickle guards 58, cutter bar blade pressure plates 59 etc.

Figure 3:
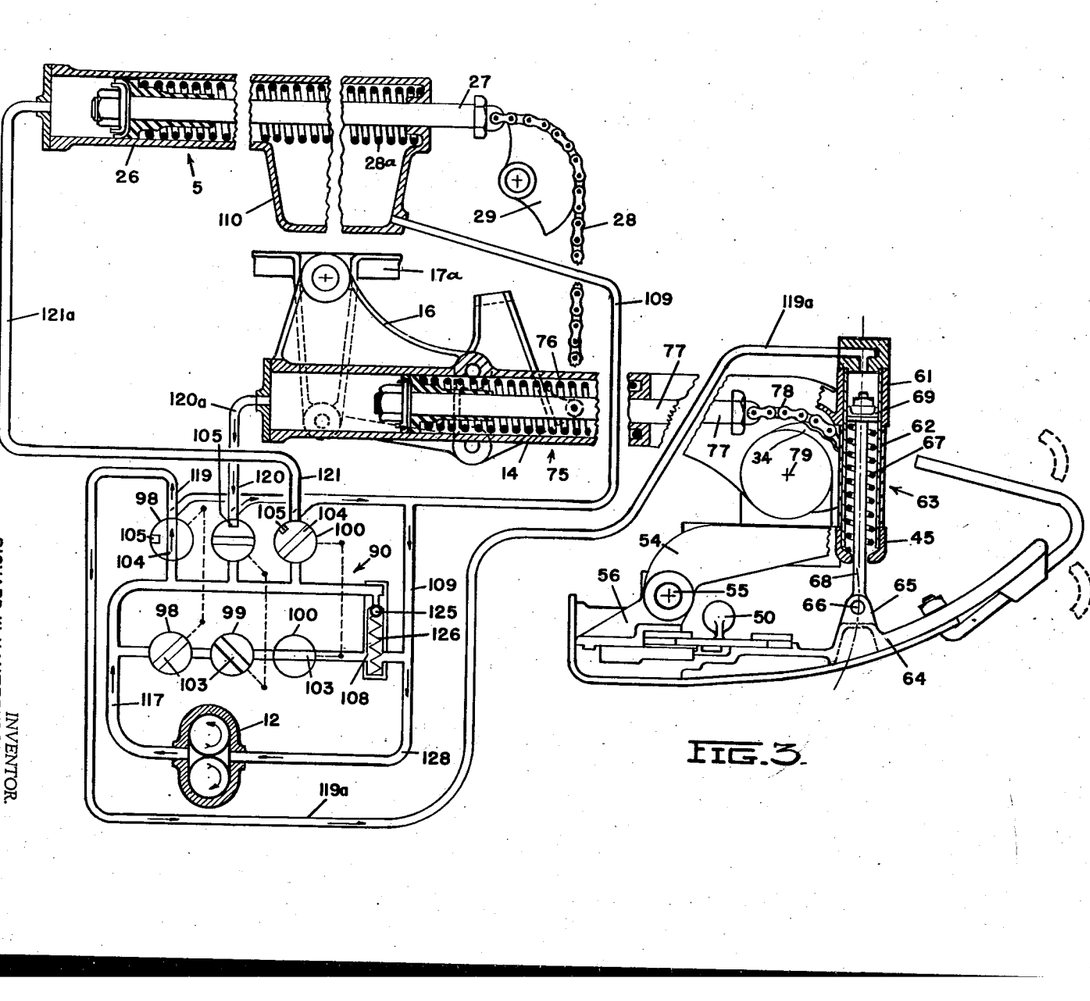
Figure 3 is a broken assembly view, partially diagrammatic, of several of the elements of the mowing machine comprising my invention, with particular reference to the apparatus for supporting and manipulating the cutter bar to the several positions previously indicated which it is required to occupy during the operation of the machine.

As most clearly illustrated in Fig. 2, gear housing 31 has a trunnion 60 extending centrally upwardly therefrom on which is mounted an upper casting 61. This upper casting, as illustrated in Figs. 1 and 3, is connected to and secured to the lower casting 45 by means of a tubular member 62 which also serves as the cylinder element of the jack generally indicated at 63. The casting 56, which, as previously indicated, is pivotally connected to the arm 54 of the casting 45 and which is bolted to the inner end of the cutter bar as at 56a, extends forwardly in a projection 64 which is provided with an upwardly extending ear 65 carrying a pivot pin 66

Mounted in the cylindrical member 62, i. e., cylinder of the jack 63, is a spring 67 and a piston 68. The upper end of the piston carries piston head 69 and at its lower end, it is pivotally connected by means of the pin 66 to the forward extension 64 of the casting 56. The spring 67 is so designed, i. e., is of sufficient strength, so that it normally maintains the piston 68 in the uppermost position in the cylinder 62, even when the cutter bar is connected to the casting 56 and when the mowing machine is in operation.

If now fluid under pressure is admitted to the upper end of the cylinder 62 and the piston therein moves downwardly compressing the spring 67, the casting 56 will be rotated in a clockwise direction about the axis of the pivot pin 55; thus, changing the angle of the cutter bar with respect to the plane in which the same lies. The jack 63 is, therefore, effective to tilt the leading edge of the cutter bar to any desired position as the cutter bar is drawn along over the ground. Tilting of the cutter bar in the manner described raises and lowers the cutting edge thereof with respect to the ground over which the cutter bar is drawn; thus, regulating the height of the cut made by the cutter bar and serving to "rake" under fallen grass or "ride over" small stones, etc.

Figure 7:
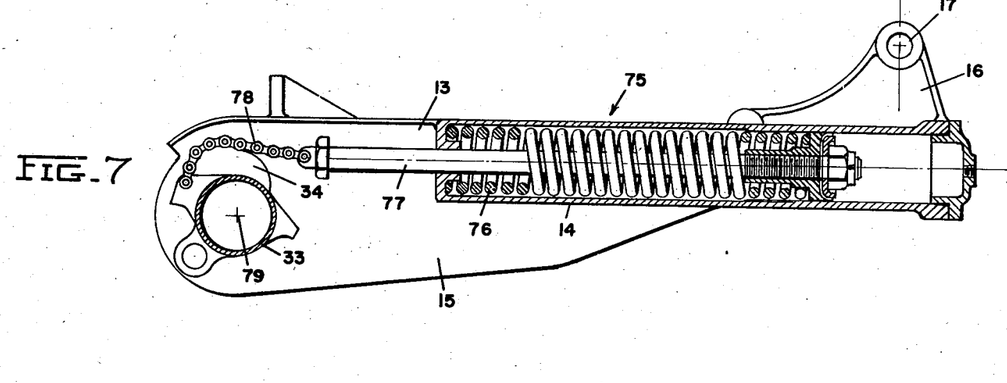
Figure 7 is a side elevational view, partially in section, of a portion of the assemblage illustrated in Fig. 6, Figure 7 showing in particular the hydraulic jack associated with and forming a part of the cutter bar supporting arm shown in Fig. 6, which jack is employed for the purpose of adjustably securing the cutter bar in predetermined angular relation with respect to the cutter bar supporting arm.

By having particular reference to Fig. 2, it will be observed that the cutter bar assembly is anchored to the bottom of the tractor by means of an arm 70 which, at its forward end, is pivotally connected to the bracket 71 on the bottom of the tractor and at its rear end is integral with an arm 72. The illustration of arm 70 is omitted from Fig. 1 since it would hide the parts such as arm 3 behind it. The arm 72 formed integrally with the arm 3 is provided with an extension 73 which rotatably embraces the trunnion 32 of the gear housing 30. It will thus be observed that the gear housing 30 and the cutter bar supporting casting 45 are capable of pivotal movement about the axis of the shaft 35 so that the cutter bar and its associated inner head may swing in a vertical plane which is substantially normal to the longitudinal axis of the machine proper. Such pivotal movement is effected by means of the jack 75, most clearly illustrated in Fig. 7. The jack 75 comprises the cylinder 14 which is formed integrally with the casting which comprises the arm 3.

Mounted in the cylinder 14 is a spring 76 and a piston 77, the forward end of which carries a chain 78 which passes around the segment 34 on the gear housing. By having reference to Fig. 7, it will be observed that the ordinal 79 denotes the axis of the shaft 35, i. e., the axis about which the gear housing and the cutter bar assembly supported thereon rotates. The spring 76 is, of course, normally under compression, since the counter-clockwise movement of the cutter bar 6, as viewed in Fig. 1, tends to rotate the element 33 in a counter-clockwise direction, urging the piston 77 to the left. The spring 76 is of such a design as to be capable of more than counterbalancing such counter-clockwise movement, i. e., when no fluid is admitted to the righthand end of the cylinder 14, as viewed in Fig. 7, the spring 76 extends, moving the piston 77 to the right, rotating the member 33 to the right and accordingly rotating the entire inner cutter bar head in a clockwise direction, as viewed in Fig. 1, until the cutter bar occupies a position folded against the vehicle.

As the spring 76 extends itself, the force which it exerts on the piston 77, of course, varies in accordance with the degree to which the spring has been extended.

It will also be observed that the effective length of the movement arm of the cutter bar 6 decreases as the cutter bar is folded towards the tractor. By a design of the contour of the segment 34 so that the length of the moment arm of the spring 78 about the axis 79 is progressively shortened as the cutter bar moves through its different positions from the horizontal to the vertical about the axis 79, the force of the spring 76 is thus made effective to, at all times, counterbalance the cutter bar 6.

The break-back, i. e., the construction by which the cutter bar is normally held in position, illustrated, for example, in full lines in Fig. 2, but is permitted to break back to the dotted line position in such figure, upon the application of a predetermined force against the leading edge of the cutter bar, will now be described.

As previously indicated, the casting 45, which carries the cutter bar, is capable of pivotal movement with respect to the gear housing 31 on which it is mounted. Since such pivotal movement is about an axis coincident with the axis of the shaft 40, this breaking back of the cutter bar may occur without placing any undue stress on the mechanism by which driving communication is established between the tractor and the cutter bar blades.

The upper face of the casting 45, i. e., that adjacent the lower face of the housing 31, is provided with a recess 80 in which is fitted a substantially conical member 81 of hardened steel. The substantially conical member 81 is secured in the recess 80 by means of a set-screw 82, the upper end of which projects into the lower end of the substantially conical member 81 to a degree which is adjustable, depending upon the upward extent of the set-screw 82.

The gear housing 31 is, at one side, provided with a substantially cylindrical housing 83 in which is positioned a ball 84 and a spring 85. The spring 85 is under compression and urges the ball 84 downwardly against the upper face of the casting 45. When the casting 45 and the housing 31 are so positioned relatively to each other that the guide 83 coincides with the recess 80, the ball 84 will drop into the substantially conical member 81 to the extent permitted by the upward projection of the set-screw 82.

It will be observed that the lower end of the guide 83 is also provided with a hardened steel insert 81a. If the ball 84 is in the position illustrated in Fig. 8, for example, relative rotation between the housing 31 and the casting 45 is resisted by the force necessary to force the ball upwardly out of the recess in the casting 45 so that it may clear the edge of such recess and ride along on the upper face thereof. Obviously the force necessary to thus displace the ball out of the recess and permit relative rotation between the housing 31 and the casting 45 depends upon the amount by which the ball is permitted to project into the member 81. If the ball were permitted to drop into the member 81 so that the equator thereof coincides with the plane of relative movement between the members 31 and 45, the ball would serve to rigidly lock such members together. If now the ball is raised to a slight extent, as by a rotation of the set-screw 82, the amount of force required to break this yieldable connection may be reduced to any desired extent.

The casting 45 carries an abutment 86 adjacent the opening 80, which abutment carries a set-screw 87, the forward end of which is adapted to engage the casing 83. This abutment serves to limit the counter-clockwise movement of the cutter bar as viewed in Fig. 2, to such an extent that the ball just drops into the member 81, in this way ensuring against any looseness in the connection. The upper face of the casting 45 is provided with a ground surface generally indicated at 88, along which the ball moves when a break-back occurs, i. e., when the gear casing 31 rotates relatively to the casting 45.

From the foregoing description it will be observed that each of the several jacks, i. e. Nos. 5, 63 and 75, are each of a single acting construction, that is the spring in each case is sufficiently strong to move the piston of the jack to the full retarded position even when such jack is connected with the apparatus which it is designed to control and position. In this way it is only necessary to introduce fluid under pressure in the end of the cylinder opposite the spring to compress the spring to the desired extent in order to control the position of the part to which the jack is connected. The control system for the several jacks above described is illustrated in Fig. 3, which, in addition to the jacks 5, 63 and 75, includes the pump 12 and a compound control valve generally indicated at 90. Before proceeding with a description of the control system it is believed well to first describe the construction and operation of the control valve 90 which is shown in Figs. 10 to 17.

Figure 10:
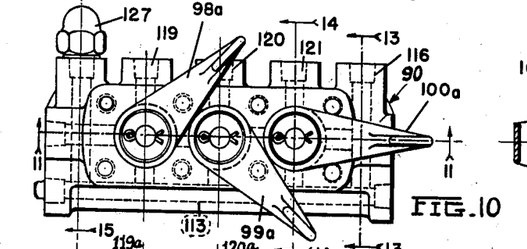
Figure 10 is a plan view of the hydraulic control valve employed for the purpose of controlling the flow of hydraulic fluid to and from the several jacks which form a part of the cutter bar manipulating and securing assembly.
Figure 11:
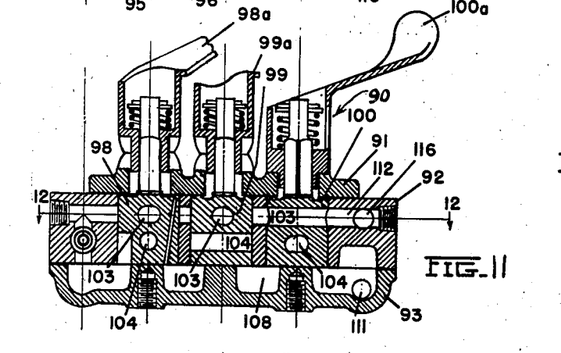
Figure 11 is a transverse sectional view of the valve illustrated in Fig. 10, taken on a plane substantially indicated by the line 11—11.
Figure 12:
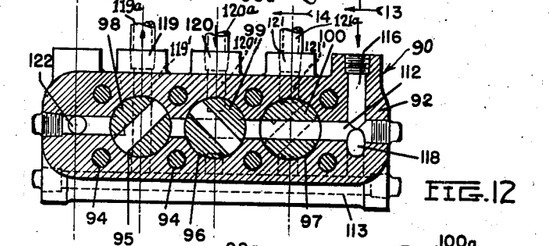
Figure 12 is a transverse sectional view of this valve assembly taken on a plane substantially indicated by the line 12—12 in Fig. 11.
Figures 16, 17:
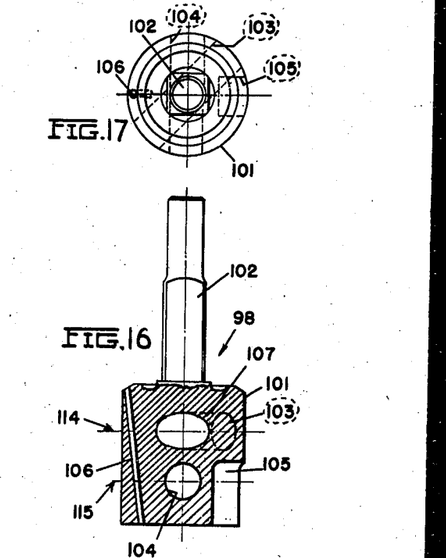
Figure 16 is a side elevational view, partially in section (drawn to an enlarged scale) of one of the rotatable plugs of the valve assembly illustrated in Figs. 10 to 12 this figure being taken by first removing one of the rotatable plugs from the valve and then showing it in side elevation with the base portion thereof partially in section.
Figure 17 is a plan view of the plug illustrated in Fig. 16.

Referring now more specifically to Figs. 10 to 12, it will be observed that the control valve comprises an upper section 91, a central section 92 and a lower section 93. The valve is thus made in sections in order to facilitate manufacture thereof and such sections are secured in assembled relation by a plurality of bolts, such as 94, passing therethrough. The central section in which the valving functions are performed has three cylindrical openings 95, 96 and 97 therein in which are positioned plugs 98, 99 and 100 respectively. These plugs are all of identical construction and one of the same (98 for example) is more fully illustrated in Figs. 16 and 17. The plug consists of an enlarged substantially cylindrical portion 101 and a stem 102. The cylindrical body 101 has two passages, 103 and 104, therein. These passages are in different planes, as illustrated in Fig. 16, and angularly related to each other, as illustrated in Fig. 17. In addition the cylindrical body 101 is relieved on one side thereof as at 105.

A small drain passage 106 is provided in each valve body 101 and such body is provided with a ground sealing seat 107.

Figure 13:
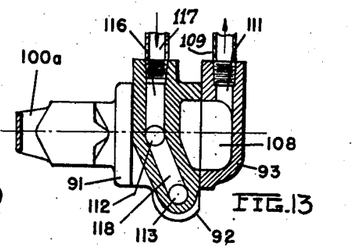
Figure 13 is a transverse sectional view of the portion of the assembly illustrated in Fig. 10, taken on a plane substantially indicated by the line 13—13.
Figure 14:
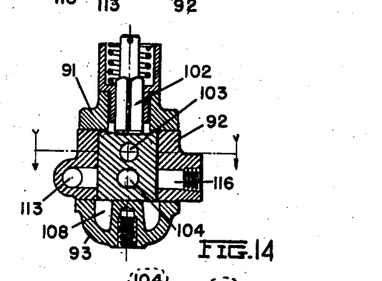
Figure 14 is a transverse sectional view of the valve assembly illustrated in Fig. 10, taken on a plane substantially indicated by the line 14—14, which plane is at right angles to the plane on which Fig. 13 was taken.

The lower member 91 of the valve serves as a collecting sump 108 and such collecting sump is in communication by means of a conduit 109 with the main sump 110 of the system, which is conveniently an enlargement of the cylinder wall of the jack 5, the conduit 109 being connected to the opening 111 of the valve body, as most clearly illustrated in Fig. 13. As illustrated in Fig. 2, conduit 109 is also connected to the intake side of the pump 12.

Each of the stems 102 has a handle associated therewith for actuation of the associated plug, such handles being for convenience designated by th. ordinals 98a, 99a and 100a to correspond to the ordinals employed for the purpose of designating the plugs which are controlled by such handles.

Figure 15:
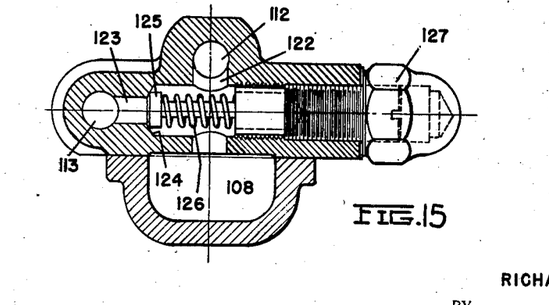
Figure 15 is a transverse sectional view (drawn to an enlarged scale) of a portion of the valve assembly illustrated in Fig. 10, taken on a plane substantially indicated by the line 15—15, which plane is at right angles to the plane on which Fig. 13 was taken.

The central member 92 of the valve body is provided with two longitudinal passages therein, these being respectively designated by the ordinals 112 and 113. The passage 112 is arranged in the plane 114 which intersects the passages 103 in the plugs, and the passage 113 is in the plane 115 which intersects the passage 104 in the plugs. The central member 92 is provided with a laterally extending inlet passage 116 leading from the pump and to which the conduit 117 of Fig. 3 is connected. A branch passage 118 leads from the passage 112 downwardly to the passage 113, as viewed in Fig. 12. Branch passages 119', 120' and 121', respectively extend from the passage 113 across the body of the central member 92 and terminate in openings 119, 120 and 121. In these openings are secured conduits 119a, 120a and 121a respectively which lead to jacks 63, 75 and 5 respectively. These transverse passages lie in the plane 115 of Fig. 16 and are accordingly controlled by the passages 104 in the several plugs. The left hand end of the central passage 112, as viewed in Figs. 10 to 12, is in communication with the sump 108 by means of the passage 122. The passage 113 is in communication with the sump 108 by means of the passage 123. As illustrated in Fig. 15, the passage 123 is provided with a valve seat 124 against which is resiliently urged a valve 125 by means of a spring 126, the latter being held in position and the degree of compression thereof adjusted by a conventional securing means generally indicated at 127.

There are three possible settings of each of the valves and such settings are respectively illustrated by the positions of the valves 98, 99 and 100.

Valve 98 is so positioned that the hydraulic fluid is being admitted to the jack which the valve controls.

Valve 99 is so positioned that the passage between the jack and the sump is open, i. e. the hydraulic fluid from the jack is being forced back to the sump under the influence of the spring in the jack.

Valve 100 is so positioned that the passage to the jack is blocked, locking the fluid in the cylinder of the jack and accordingly securing the piston thereof in the selected position.

It will be observed that when all of the valves are in a position corresponding to valve 100, i. e. when the pump is not required to deliver fluid to any of the jacks, then the passages 103 will all be aligned in the passage 112 so that the hydraulic fluid delivered by the pump passes directly through the passage 112 downwardly through the passage 122 into the sump 108 and thence back to the intake side of the pump through the conduit 128. Just as soon as one of the valves is positioned for flow of hydraulic fluid either to or from the jack the plug of such valve will be so positioned that the passage 112 is blocked, in which case the fluid delivered by the pump passes through the passage 118 into the passage 113 where a sufficient pressure is maintained to unseat the valve 125.

It will be observed that the passages 104 are the passages in the several plugs which establish communication between the pressure passage 113 and the passage in the valve which leads to the jacks. It will also be observed that the relieved area 105 is the passage in the plug by which the fluid is permitted to flow from the opening which leads to the jack into the sump 108.

It will be observed that the ground sealing area 107 bears against the upper member 91 of the valve assembly and prevents leakage of hydraulic fluid by the opening through which the stems project. Any hydraulic fluid which does seep upwardly by the outer surfaces of the plugs is collected in the small annular area around the upper periphery of such plugs and returned to the sump through the bleeder passage 106.

The several valves arranged as illustrated in Figs. 10 to 12 are shown diagrammatically in Fig. 3. However, in view of the previous description of such valves it is believed unnecessary to more specifically describe the arrangement illustrated in such last-named figure.

From the foregoing it will be observed that I have provided a mowing machine which is extremely flexible in the movements which are permitted by the cutter bar, and, furthermore, that the sickle bar may be operated in a cutting fashion irrespective of the position occupied by the cutter bar.

Figure 4:
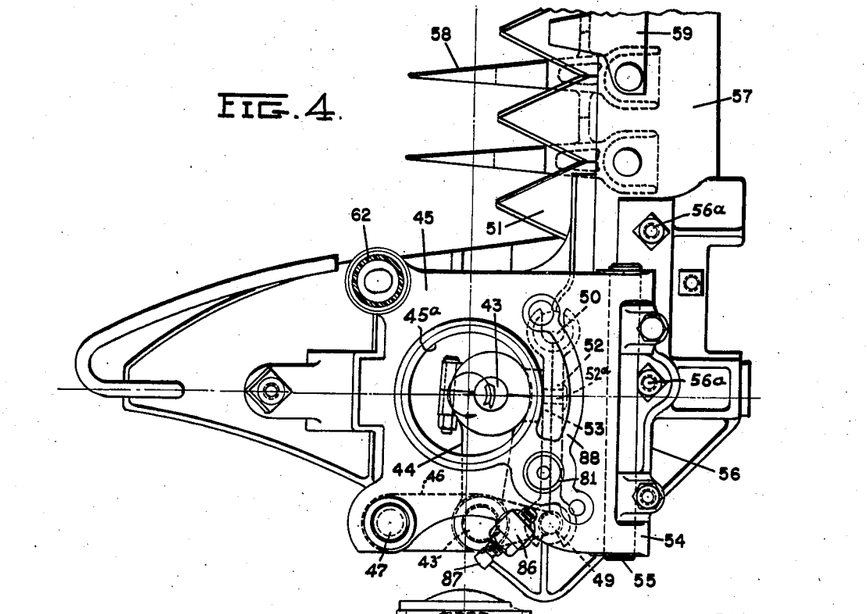
Figure 4 is a plan view, drawn to an enlarged scale, of a portion of the inner cutter bar head showing in particular the means whereby such head is adjustably supported and the cutter bar blade reciprocated.

The illustrated and previously described form of construction, it will be observed, utilizes a mechanical drive for the sickle bar, such drive being secured by means of the belts and pulleys previously described. It is within the contemplation of my invention, however, to supplant such mechanical driving means for the sickle bar by means of a hydraulic motor which may be constructed in accordance with conventional designs for such motors and mounted on the inner cutter bar head 4. By connecting a supply and return conduit to such hydraulic motor from the gear pump it is possible to hydraulically drive the sickle bar instead of mechanically as is the case in the apparatus which has been illustrated. This type of driving means for the sickle bar is illustrated in U. S. Patents Nos. 108,069, 1,939,851 and 1,958,405. It is obvious, of course, that hydraulic motors of the character disclosed in U. S. Patents Nos. 398,930, 519,857, 716,463 or 1,168,028 may be employed in this arrangement instead of the specific type of motor shown in the first three named patents. In view of this clear disclosure in the prior art of such expedient it is unnecessary to illustrate the same in the drawings in the present case.

As previously indicated, it will be observed that the several jacks employed are each of the single-acting type, i. e., the hydraulic fluid moves the jack in only one direction with the jack being urged for movement in the opposite direction by a spring. This construction permits the cutter bar and the cutter bar supporting frame to "float" on or above the ground and be free to rise upon striking a rock or other obstruction, thus preventing damage to the machine.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a mowing machine of the type having a cutter bar pivotally supported at its inner end on the machine and movable about such pivotal support into the normal operating position extending laterally of its support and into a position standing substantially vertically, of resilient means interconnecting the machine and cutter bar and strong enough to normally maintain the cutter bar in the substantially vertical position and power means connected with said resilient means and said machine to counteract said resilient means sufficiently to permit the cutter bar to move by gravity about its pivotal support into the laterally extending position.

2. The combination with a mowing machine of the type having a cutter bar pivotally supported at its inner end on the machine and movable about such pivotal support into the normal operating position extending laterally of the machine and into a position standing substantially vertically, of resilient means interconnecting the machine and cutter bar and strong enough to normally move the cutter bar from the laterally extending position to the substantially vertical position and power means connected with said resilient means and said machine to counteract said resilient means by selective degrees to permit the cutter bar to move by gravity about its pivotal support from the substantially vertical position into selected positions intermediately of said substantially vertical and laterally extending positions.

3. The combination with a mowing machine of the type having a cutter bar arm pivotally supported at its inner end on the machine and a cutter bar movably supported on the outer end of said arm with said arm movable about its pivotal support on the machine to move the cutter bar into relatively raised and lowered positions, of resilient means interconnecting the machine and cutter bar arm and strong enough to normally maintain said arm in raised position and power means connected with said resilient means and said machine to counteract said resilient means sufficiently to permit the cutter bar arm to move by gravity about its pivotal support into the relatively lowered position.

4. The combination with a mowing machine of the type having a cutter bar pivotally supported at its inner end on the machine and movable by gravity about such pivotal support on an axis extending longitudinally of the cutter bar into a position with the guard fingers extending forwardly and downwardly and capable of being moved about such pivotal support into position with the guard fingers extending forwardly and upwardly, of resilient means interconnecting the machine and cutter bar and strong enough to normally maintain the cutter bar in position with its guard fingers extending forwardly and upwardly and power means connected with said resilient means and said machine to counteract said resilient means sufficiently to permit the cutter bar to move by gravity to a selected degree about its said pivotal support.

5. The combination with a mowing machine of the type having a cutter bar pivotally supported at its inner end on the machine and movable about such pivotal support into a plurality of operative positions in a plane extending transversely of the longitudinal axis of the machine, of resilient means interconnecting the machine and cutter bar and strong enough to normally maintain the cutter bar in the raised position in said plane and power means connected with said resilient means and said machine to counteract said resilient means sufficiently to permit the cutter bar to move by gravity about its pivotal support into its various operative positions in said plane.

6. The combination with a mowing machine of the type having a cutter bar arm pivotally supported at its inner end on the machine on a first axis, a cutter bar head pivotally supported on the outer end of said arm about a second axis and a cutter bar pivotally supported at its inner end on said head about a third axis with said parts so arranged that said arm, head and cutter bar are caused to rotate by gravity respectively about said first, second, and third axes so that the cutter bar extends laterally of the machine with its guard fingers pointed forwardly and downwardly, first, second and third resilient means respectively interconnecting the machine and cutter bar arm; the cutter bar arm and head and the cutter bar head and cutter bar and strong enough to overcome the effect of gravity in rotating said parts about said axes and first, second and third power means respectively connected with said first resilient means and said machine; with said second resilient means and said arm; and with said third resilient means and said head to counteract said resilient means respectively sufficiently to permit said arm, head and cutter bar to move by gravity about their respective pivotal supports to a selected degree.

RICHARD W. HAUTZENROEDER.